(12) United States Patent
Kihara

(10) Patent No.: US 7,046,409 B2
(45) Date of Patent: May 16, 2006

(54) HOLOGRAPHIC STEREOGRAM FORMING APPARATUS

(75) Inventor: Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 10/829,202

(22) Filed: Apr. 22, 2004

(65) Prior Publication Data

US 2004/0263929 A1    Dec. 30, 2004

(30) Foreign Application Priority Data

May 8, 2003    (JP) ............................. 2003-129813

(51) Int. Cl.
*G03H 1/26* (2006.01)

(52) U.S. Cl. ...................................... 359/23
(58) Field of Classification Search .................. 359/23, 359/35
See application file for complete search history.

(56) References Cited

U.S. PATENT DOCUMENTS 4,411,489 A * 10/1983 McGrew ...................... 359/9
5,949,559 A * 9/1999 Kihara et al. ................ 359/23
6,185,018 B1 * 2/2001 Kihara ........................ 359/23
6,195,185 B1 * 2/2001 Shirakura et al. ............. 359/35
6,400,474 B1 * 6/2002 Shirakura .................... 359/23

* cited by examiner

*Primary Examiner*—Mark A. Robinson
*Assistant Examiner*—Alessandro Amari
(74) *Attorney, Agent, or Firm*—Oblon, Spivak, McClelland, Maier & Neustadt, P.C.

(57) ABSTRACT

Between a spatial beam modulator for modulating an object beam and a one-dimensional diffuser plate for diffusing the object beam modulated by the spatial beam modulator in a one-dimensional direction, there is arranged an object projection optical system for processing the object beam modulated by the spatial beam modulator in such a manner that, in the one-dimensional direction of the one-dimensional diffuser plate, images displayed by the spatial beam modulator are formed on the one-dimensional diffuser plate, and, in a direction substantially orthogonal to the one-dimensional direction, the object beam is condensed onto a hologram recording medium. In the one-dimensional direction of the one-dimensional diffuser plate, the images displayed by the spatial beam modulator are formed on the one-dimensional diffuser plate, whereby blurring of the images with the one-dimensional direction as a non-parallactic direction can be suppressed.

4 Claims, 5 Drawing Sheets

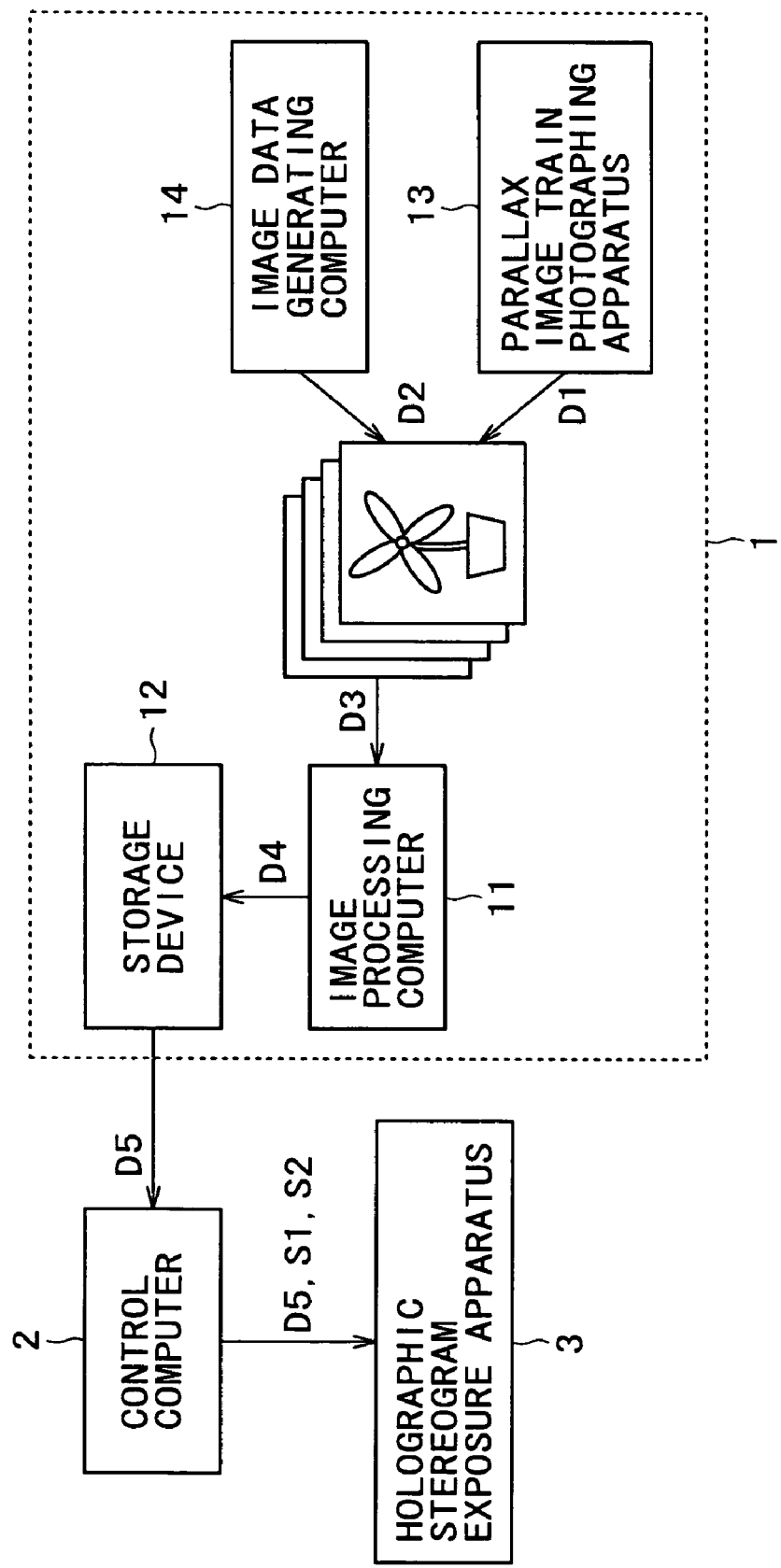

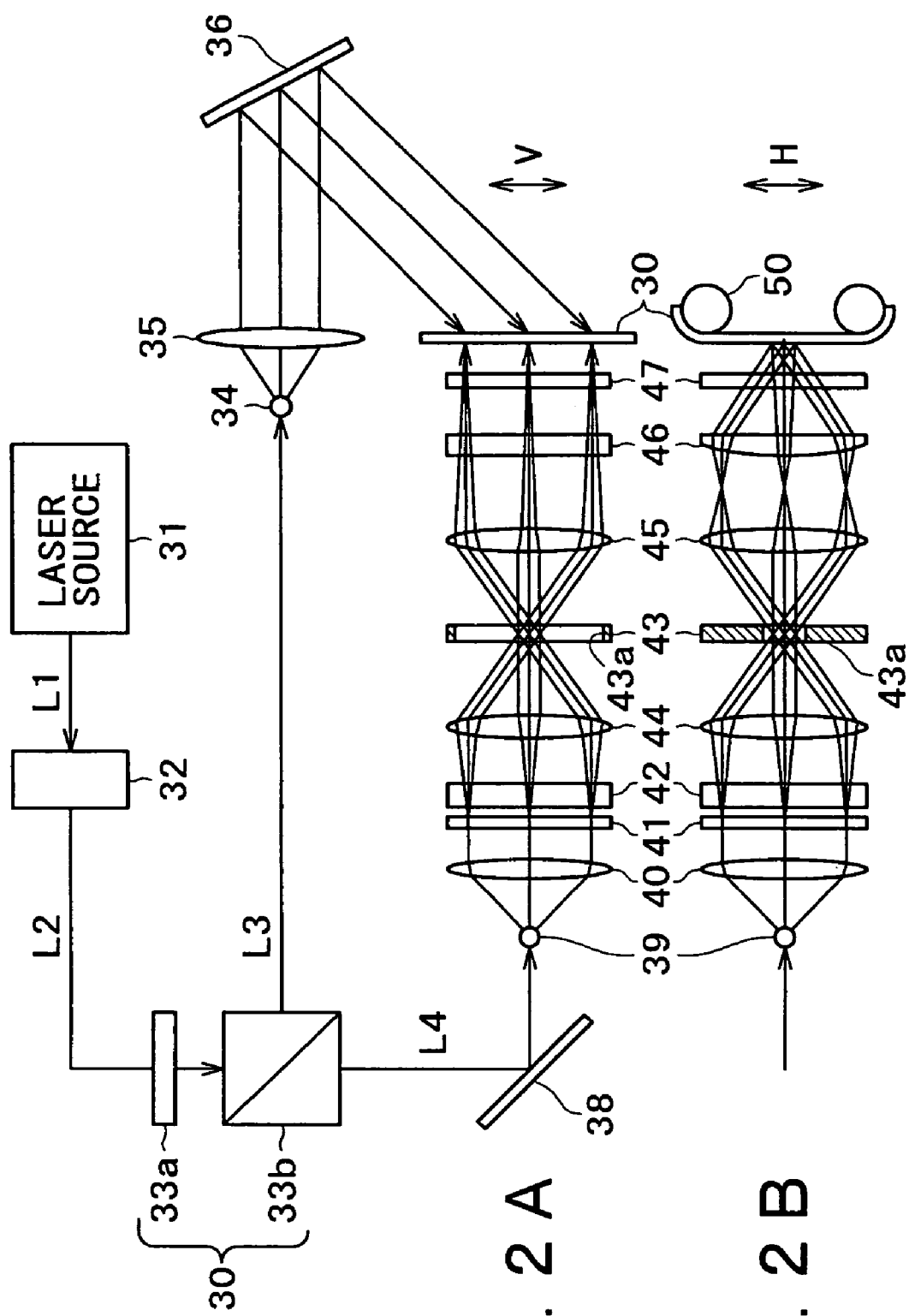
F I G. 2A
F I G. 2B

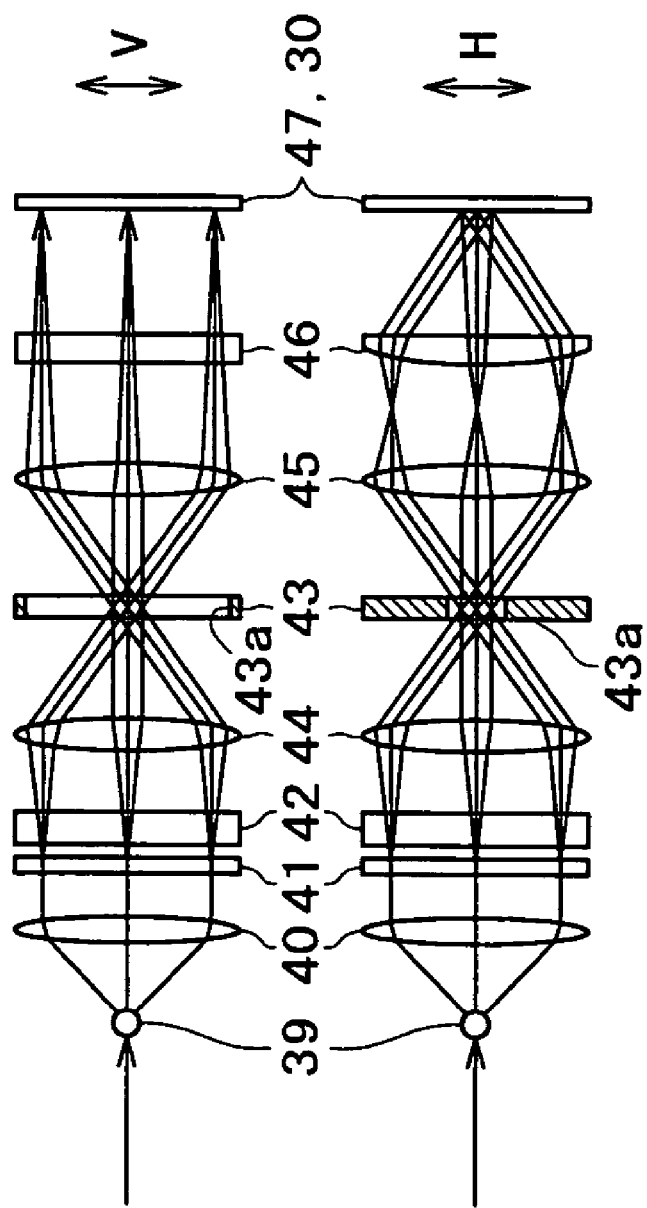

HOLOGRAPHIC STEREOGRAM FORMING APPARATUS

BACKGROUND OF THE INVENTION

The present invention relates to a holographic stereogram forming apparatus which enables three-dimensional recognition of photographed images, computer-produced images and the like.

A holographic stereogram is formed by a method in which a multiplicity of images obtained by sequentially photographing a subject from different observation points are prepared as original images, and these images are sequentially recorded on a single hologram recording medium as paper tables-like or dot form elementary holograms.

For example, in a holographic stereogram having parallax information only in a horizontal direction, a plurality of original images obtained by sequentially photographing a subject from different observation points in the horizontal direction are sequentially recorded on a hologram recording medium as paper tablet-like elementary holograms.

When the holographic stereogram is viewed from a certain position by one eye, a two-dimensional image consisting of a collection of image information of parts of the individual elementary holograms is seen, and, when the position of the eye is moved in a horizontal direction, a two-dimensional image consisting of a collection of image information of other parts of the individual elementary holograms is seen. Therefore, when an observer looks at the holographic stereogram by both his eyes, slightly different two-dimensional images are seen to the left and right eyes, since the positions of the left and right eyes are slightly different in the horizontal direction.

Meanwhile, in the formation of the holographic stereogram, the individual elementary holograms are each formed through the process in which a laser beam with good coherence is branched into two beams, one of the beams is condensed on the hologram recording medium having a photosensitive material as a recording material as a projection image (object beam) modulated according to a two-dimensional image by image display means (for example, a liquid crystal panel), while the other of the beams is condensed on the hologram recording medium as a reference beam, and an interference fringe is recorded on the hologram recording medium as variations in refractive index of the photosensitive material.

In this instance, in the case of a reflection type hologram, a diffuser plate (one-dimensional diffuser plate) may be disposed in front of the hologram recording medium in order to cope with the movement of the visual point in the vertical direction (non-parallactic direction) (in order to secure the angle of visibility in the non-parallactic direction) (see, for example, Japanese Patent Laid-open No. Hei 10-20747).

In the case where the one-dimensional diffuser plate is thus arranged in front of the hologram recording medium, blurring may be generated in the non-parallactic direction, due to the difference in focus between the parallactic direction and the non-parallactic direction.

SUMMARY OF THE INVENTION

In consideration of the foregoing, it is an object of the present invention to provide a holographic stereogram forming apparatus capable of forming a holographic stereogram which is in focus also in a non-parallactic direction.

To attain the above object, in accordance with the present invention, there is provided a holographic stereogram forming apparatus including: a laser source for emitting a laser beam; beam separating means for separating the laser beam emitted from the laser source into a reference beam and an object beam; reference beam irradiation means for irradiating a hologram recording medium with the reference beam separated by the beam separating means; a spatial beam modulator for displaying an image and modulating the object beam separated by the beam separating means; a one-dimensional diffuser plate for diffusing the object beam modulated by the special beam modulator in a one-dimensional direction; and an object projection optical system for processing the object beam modulated by the spatial beam modulator in such a manner that, in the one-dimensional direction of the one-dimensional diffuser plate, the image displayed by the spatial beam modulator is formed on the one-dimensional diffuser plate, and, in a direction substantially orthogonal to the one-dimensional direction, the object beam is condensed onto the hologram recording medium.

The object projection optical system disposed between the spatial beam modulator and the one-dimensional diffuser plate processes the object beam modulated by the spatial beam modulator in such a manner that, in the one-dimensional direction of the one-dimensional diffuser plate, the image displayed by the spatial beam modulator is formed on the one-dimensional diffuser plate, and, in the direction substantially orthogonal to the one-dimensional direction, the object beam is condensed onto the hologram recording medium. In the one-dimensional direction of the one-dimensional diffuser plate, the image displayed by the spatial beam modulator is formed on the one-dimensional diffuser plate, whereby blurring of the image with the one-dimensional direction as a non-parallactic direction can be suppressed.

Here, the object projection optical system may include a spherical lens system for forming the image displayed by the spatial beam modulator in the one-dimensional direction, and a cylindrical lens system for condensing the object beam into the direction substantially orthogonal to the one-dimensional direction.

Favorable projection of the displayed image onto the hologram recording medium can be achieved, by the spherical lens system in the one-dimensional direction and by the cylindrical lens system in the direction substantially orthogonal to the one-dimensional direction.

The condensing position of the object beam in the direction substantially orthogonal to the one-dimensional direction can be regulated, for example, by regulating the spacing between the spherical lens system and the cylindrical lens system.

The holographic stereogram forming apparatus may further include means for shutting off the laser source, a mechanism for intermittently feeding the hologram recording medium, and a control mechanism for regulating the timings of the display of the image by the spatial beam modulator and the operation of the intermittent feeding mechanism.

Recording of images can be performed continuously by intermittently feeding the hologram recording material.

Thus, according to the present invention, it is possible to provide a holographic stereogram forming apparatus capable of forming a holographic stereogram which is in focus also in a non-parallactic direction.

BRIEF DESCRIPTION OF THE DRAWINGS

The above and other objects, features and advantages of the present invention will become apparent from the following description and appended claims, taken in conjunction with the accompanying drawings, in which:

FIG. 1 schematically shows the configuration of a holographic stereogram forming apparatus according to the present invention;

FIGS. 2A and 2B are schematic diagrams showing the conditions where an optical system of a holographic stereogram exposure apparatus according to the present invention is viewed in a horizontal direction and in a vertical direction, respectively;

FIGS. 5A and 5B schematically show a reference example including an optical system which is designed by ignoring the difference between the positions of a one-dimensional diffuser plate and a hologram recording medium.

DESCRIPTION OF THE PREFERRED EMBODIMENTS

Figure 3:
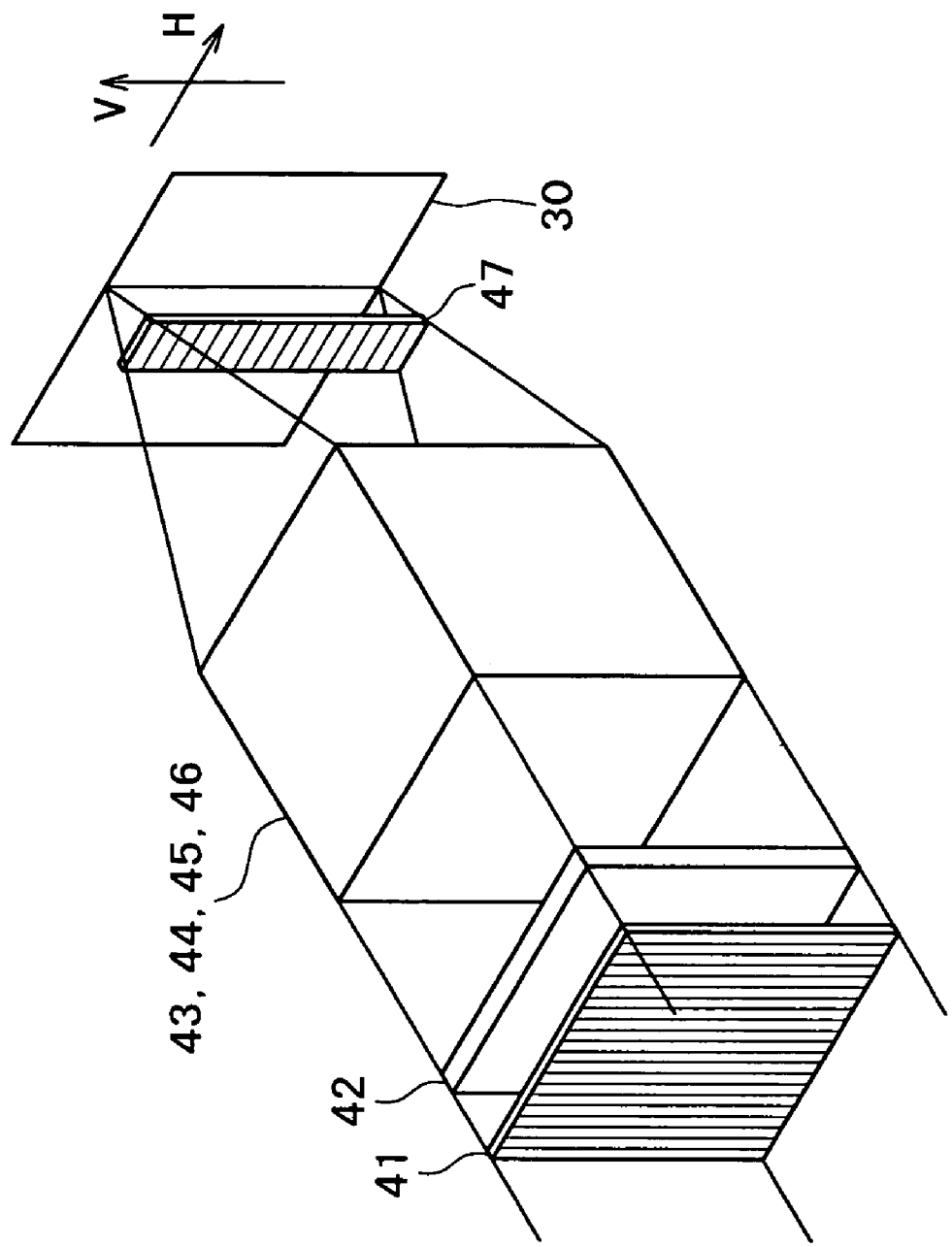
FIG. 3 is a perspective view schematically showing a portion for an object light of the optical system of the holographic stereogram exposure apparatus according to the present invention.

Now, a specific embodiment of the present invention will be described below, referring to the drawings. The present invention is not limited to the following embodiment, and the configuration can be arbitrarily modified without departure from the gist of the invention.

First, one embodiment of the configuration of a holographic stereogram forming apparatus for forming a holographic streogram will be described. Incidentally, in the present embodiment, a holographic stereogram provided with parallax information as to a horizontal direction by recording a plurality of paper tablet-like elementary holograms on a single recording medium will be taken as an example. It should be noted here, however, that the present invention is applicable also to holographic stereograms provided with parallax information as to other direction, for example, the vertical direction, in place of the horizontal direction.

The holographic stereogram forming apparatus is a system for forming a so-called one-step holographic stereogram in which a hologram recording medium with an interference fringe of an object beam and a reference beam recorded thereon is directly used as a holographic stereogram. As shown in FIG. 1, the holographic stereogram forming apparatus is comprised of a data processing unit 1 for processing image data concerning an object to be recorded, a control computer 2 for controlling the whole part of the system, and a holographic stereogram exposure apparatus 3 having an optical system for formation of a holographic stereogram.

The data processing unit 1 forms a parallax image train D3 based on a plurality of image data D1 containing parallax information which are supplied from a parallax image train photographing apparatus 13 including a multi-eye camera, a movable camera or the like, a plurality of image data D2 containing parallax information which are generated by an image data generating computer 14, and the like.

Here, the plurality of image data D1 containing parallax information which are supplied from the parallax image train photographing apparatus 13 are image data corresponding to a plurality of images which are obtained by photographing a real objects from a plurality of different observation points in a horizontal direction, by simultaneous shooting using a multi-eye camera, continuous shooting using a movable camera, or the like.

The plurality of image data D2 containing parallax information which are generated by the image data generating computer 14 are image data such as CAD (Computer Aided Design) images, CG (Computer Graphics) images, etc. produced, for example, while sequentially giving parallax in a horizontal direction.

Then, the data processing unit 1 subjects the parallax image train D3 to a predetermined image processing for holographic stereogram by an image processing computer 11. Subsequently, the image data D4 obtained upon the predetermined image processing are recorded on a storage device 12 such as a memory, a hard disk, etc.

At the time of recording the images on a hologram recording medium, the data processing unit 1 sequentially reads the data by one image amount at a time from the image data D4 recorded on the storage device 12, and outputs the thus read image data D5 to the control computer 2.

The control computer 2 drives the holographic stereogram exposure apparatus 3, whereby the images based on the image data D5 supplied from the data processing unit 1 are sequentially recorded as paper tablet-like elementary holograms on a hologram recording medium 30 set in the holographic stereogram exposure apparatus 3.

In this instance, the control computer 2 controls a shutter 32, a spatial beam modulator 42, a recording medium feeding mechanism, and the like provided in the holographic stereogram exposure apparatus 3, as will be described later. Specifically, the control computer 2 outputs a control signal S1 to the shutter 32 to control the opening and closing of the shutter 32, supplies the image data D5 to the spatial beam modulator 42 to cause the spatial beam modulator 42 to display images based on the image data D5, and outputs a control signal S2 to the recording medium feeding mechanism to control the feeding of the hologram recording medium 30 by the recording medium feeding mechanism.

The holographic stereogram exposure apparatus 3 will be described in detail, referring to FIGS. 2A, 2B, and 3. FIG. 2A shows an optical system for the whole part of the holographic stereogram exposure apparatus 3 as viewed in a horizontal direction (parallactic direction) H, and FIG. 2B shows a portion for the object beam of the optical system of the holographic stereogram exposure apparatus 3 as viewed in the vertical direction (non-parallactic direction) V. FIG. 3 is a perspective view showing the portion for the object beam of the optical system of the holographic stereogram exposure apparatus 3. A mask 43, a condenser lens 44, a collimator lens 45, and a cylindrical lens 46 which will be described later include the cylindrical lens 46 and, therefore, they as a whole constitute an anamorphic optical system.

As shown in FIG. 2A, the holographic stereogram exposure apparatus 3 includes a laser source 31 for emitting a laser beam with a predetermined wavelength, and a shutter 32, a half-wave plate (HWP) 33a, and a polarized beam splitter (PBS) 33b which are disposed on the optical axis of the laser beam L1 emitted from the laser source 31.

In the present embodiment, an argon laser with a wavelength of 514.5 nm and an output of 200 mW was used as the laser source 31.

The shutter 32 is controlled by the control computer 2 so as to be closed at the time of not exposing the hologram recording medium 30 and to be opened at the time of exposing the hologram recording medium 30.

The half-wave plate 33a and the polarized beam splitter 33b constitute beam separating means by which the laser beam L2 transmitted by way of the shutter 32 is separated into a reference beam and an object beam. The beam L3 reflected by the polarized beam splitter 33b becomes the reference beam, and the beam L4 transmitted through the polarized beam splitter 33b becomes the object beam. Incidentally, the beam separating means may be constituted by use of a half-mirror, in place of the half-wave plate 33a and the polarized beam splitter 33b.

In the above-described optical system, the optical path length of the reference beam reflected by the polarized beam splitter 33b and incident on the hologram recording medium 30 is substantially equal to the optical path length of the object beam transmitted through the polarized beam splitter 33b and incident on the hologram recording medium 30. This arrangement enhances the coherence between the reference beam and the object beam, thereby making it possible to form a holographic stereogram which gives a sharper reproduced (reconstructed) image.

On the optical axis of the beam L3 reflected by the polarized beam splitter 33b, there are disposed, as components of an optical system for the reference beam, a cylindrical lens 34, a collimator lens 35 for converting the reference beam into a parallel beam, and a total-reflection mirror 36 for reflecting the parallel beam coming from the collimator lens 35, in this order.

The beam reflected by the polarized beam splitter 33b is first converted by the cylindrical lens 34 into a diffused beam from a point source of light. That is, the cylindrical lens 34 functions as a slit for the reference beam. Next, the diffused beam is converted into the parallel beam by the collimator lens 35. Thereafter, the parallel beam is reflected by the total-reflection mirror 36, to be incident on the hologram recording medium 30.

On the other hand, as shown in FIGS. 2A and 2B, on the optical axis of the beam L4 transmitted through the polarized beam splitter 33b, there are arranged, as components of an optical system for the object beam, a total-reflection mirror 38 for reflecting the transmitted beam coming from the polarized beam splitter 33b, a spatial filter 39 composed of a combination of a convex lens and a pinhole, a collimator lens 40 for converting the object beam into a parallel beam, a diffuser plate 41 for diffusing the beam transmitted through the collimator lens 40, a spatial beam modulator 42 for displaying an image of the object to be recorded, and a mask 43 provided with a paper tablet-like opening portion (slit), in this order.

Furthermore, a first optical system for condensing the object beam transmitted through the spatial beam modulator 42 into the opening portion 43a of the mask 43 is provided between the spatial beam modulator 42 and the mask 43, and a second optical system for condensing the object beam transmitted through the mask 43 onto the hologram recording medium 30 is provided between the mask 43 and the hologram recording medium 30. In the present embodiment, the first optical system is composed of a condenser lens 44 (focal distance: 200 mm), while the second optical system is composed of a collimator lens 45 (focal distance: 600 mm) for converting the beam transmitted through the mark 43 into a parallel beam, and a cylindrical lens 46 (focal distance: 54 mm) for condensing the parallel beam onto the hologram recording medium 30.

In the case of the reflection type hologram, a one-dimensional diffuser plate 47 is generally disposed immediately in front of the hologram recording medium 30. In the present embodiment, also, a one-dimensional diffuser plate 47 is disposed as a second diffuser plate between the mask 43 and the hologram recording medium 30.

The one-dimensional diffuser plate 47 is for one-dimensionally diffusing the condensed object beam in the longitudinal direction of the paper tablet-like elementary holograms, and for corresponding to the movement of the visual point in the non-parallactic direction V (vertical direction).

Figure 4A:
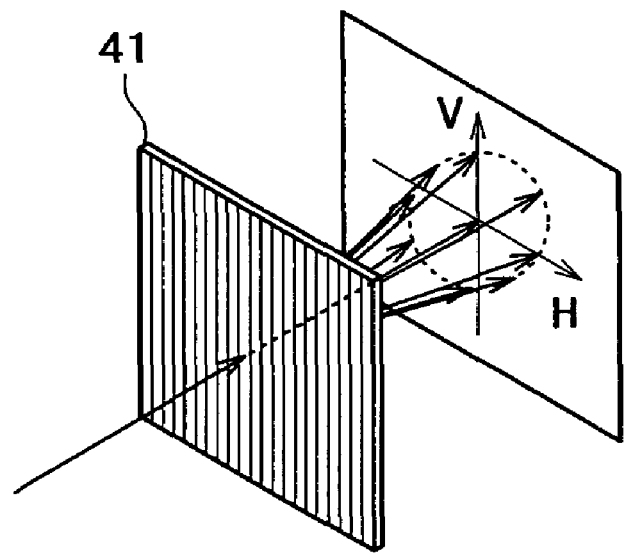
FIGS. 4A and 4B schematically show the conditions where an incident beam is diffused by a diffuser plate and by a one-dimensional diffuser plate, respectively.
Figure 4B:
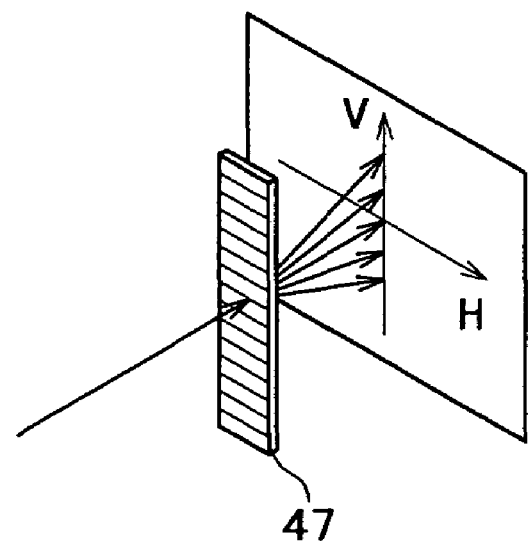

FIGS. 4A and 4B schematically show the conditions where the incident beam is diffused by the diffuser plate 41 and the one-dimensional diffuser plate 47, respectively. The diffuser plate 41 diffuses the incident beam isotropically, whereas the one-dimensional diffuser plate 47 diffuses the incident beam only in the non-parallactic direction V.

The beam L4 transmitted through the polarized beam splitter 33b is reflected by the total-reflection mirror 38, and is then converted by the spatial filter 39 into a diffused beam from a point source of light. Next, the diffused beam is converted into a parallel beam by the collimator lens 40, and is then transmitted through the diffuser plate 41, to be incident on the spatial beam modulator 42. Here, in this embodiment, an objective lens with a magnification of 20 times and a pinhole with a diameter of 20 µm were used as the spatial filter 39. Besides, the focal distance of the collimator lens 40 was 100 mm.

The spatial beam modulator 42 is a transmission type display apparatus composed of a liquid crystal display, for example. The spatial beam modulator 42 is controlled by the control computer 2, so as to display images based on the image data D5 sent from the control computer 2. In the present embodiment, a black-and-white liquid crystal panel with a number of pixels of 480×1068 and a size of 16.8 mm×29.9 mm was used.

The beam transmitted through the spatial beam modulator 42 becomes a transmitted beam according to the images displayed by the spatial beam modulator 42.

The diffuser plate 41 may be disposed immediately in front of the spatial beam modulator 42 or immediately behind the spatial beam modulator 42, inasmuch as it is provided in the vicinity of the spatial beam modulator 42. In the present embodiment, the diffuser plate 41 was disposed immediately in front of the spatial beam modulator 42.

The diffuser plate 41 slightly diffuse the beam incident on the spatial beam modulator 42 or the beam transmitted through the spatial beam modulator, so as to diffuse the beam into the elementary holograms, thereby contributing to enhancement of image quality of the holographic stereogram formed.

In this case, the diffuser plate 41 may be fixed, or may be moved at random each time the elementary hologram is formed so that the position thereof is changed on the basis of each elementary hologram. This makes it possible to reduce the noise positioned at an infinite point upon observation of the hologram.

With the diffuser plate 41 thus disposed, the area in the width of the elementary holograms is exposed uniformly, so that the image quality of the hologram obtained is enhanced. In order to realize the uniform exposure, however, it is necessary to strengthen the diffusion by the diffuser plate 41 to a certain extent, so that the object beam diffused by the diffuser plate 41 will have a spreading on the hologram recording medium 30, resulting in that an area wider than the original width of the elementary holograms is exposed. In view of this, unrequired beam is intercepted by the mask 43 so that each elementary hologram will be exposed in an appropriate width.

Where the mask 43 is disposed immediately in front of the hologram recording medium 30, the surroundings of the hologram recording medium 30 are complicated. In this embodiment, for obviating the complication, the first optical system and the second optical system are arranged, and the mask 43 is spaced apart from the hologram recording medium 30.

To be more specific, the transmitted beam coming from the spatial beam modulator 42 is condensed by the condenser lens 44 which constitutes the first optical system. In this instance, under the influence of the diffuser plate 41, the object beam is not condensed into one point but spread over a certain range. Of the condensed beam thus spread, only a predetermined range in a central portion is transmitted through the opening portion 43a of the mask 43, only the beam thus transmitted through the opening portion 43a is converted into a parallel beam by the collimator lens 45 in the second optical system, and the parallel beam is again condensed by the cylindrical lens 46, to be incident on the hologram recording medium 30 as the object beam.

The object beam is paper tablet-like in shape. The condensing range of the object beam is in the shape of projection to f3/f2 times the opening portion 43a of the mask 43, where f2 is the focal distance of the collimator lens 45, and f3 is the focal distance of the cylindrical lens 46.

Between the mask 43 and the hologram recording medium 30, there is disposed the one-dimensional diffuser plate 47 as a second diffuser plate. By the one-dimensional diffuser plate 47, the object beam passed through the mask 43 is one-dimensionally diffused in the longitudinal direction (non-parallactic direction V) of the paper tablet-like elementary holograms, before being incident on the hologram recording medium 30. This makes it possible to enlarge the angle of visibility of the reflection type hologram in the non-parallactic direction V.

The one-dimensional diffuser plate 47 may be in a fixed state. To obviate the noise positioned on the hologram plane, however, it is preferable for the one-dimensional diffuser plate 47 to be moved each time of exposure of each elementary hologram, in the same manner as the first diffuser plate 41. The moving direction is arbitrary; generally, however, the moving direction is set in the longitudinal direction (non-parallactic direction V) of the paper tablet-like elementary holograms, for obviating the generation of streaks in the horizontal direction.

In the present embodiment, the difference between the respective positions of the one-dimensional diffuser plate 47 for securing the angel of visibility in the non-parallactic direction V and the hologram recording medium 30 is taken into account, thereby contriving a reduction in the fuzziness in the non-parallactic direction V.

As a reference example, an optical system configured by ignoring the difference between the respective positions of the one-dimensional diffuser plate 47 and the hologram recording medium 30 is shown in FIG. 5, and description will be made through comparison of FIG. 5 with FIG. 2.

In the reference example, the difference between the positions of the respective planes (a one-dimensional diffusion plane and the hologram plane) of the one-dimensional diffuser plate 47 and the hologram recording medium 30 is ignored, and an ideal case where these planes coincide with each other is being considered. In this case, image formation on the common plane is made in the non-parallactic direction V and focusing on the common plane is made in the parallactic direction H, whereby the angle of visibility in the non-parallactic direction can be enlarged by the one-dimensional diffuser plate 47.

However, the one-dimensional diffusion plane of the one-dimensional diffuser plate 47 and the hologram plane of the hologram recording medium 30 do not perfectly coincide with each other. In this case, if both image formation on the hologram plane in the non-parallactic direction V and focusing on the hologram plane in the parallactic direction are performed, sharp images would not be formed on the one-dimensional diffusion plane of the one-dimensional diffuser plate 47. As a result, the sharpness of the images formed on the hologram plane by the diffused beam coming from the one-dimensional diffuser plate 47 is lowered. Specifically, blurring in the non-parallactic direction V is generated in the images recorded on the hologram recording medium 30.

In the present embodiment, images in the non-parallactic direction V are formed on the one-dimensional diffusion plane of the one-dimensional diffuser plate 47, whereas the focus in the parallactic direction H is formed on the hologram plane of the hologram recording medium 30, whereby imaged sharp in both the non-parallactic direction V and the parallactic direction H are recorded on the hologram recording medium 30.

Where the optical system is so adjusted that the formation of images in the non-parallactic direction V is performed at the position on the hologram plane of the hologram recording medium 30, blurring is generated in the images on the one-dimensional diffusion plane of the one-dimensional diffuser plate 47. In this case, since formation of images on the hologram recording medium 30 is performed through projection thereon of the images formed on the one-dimensional diffuser plate 47, blurring is generated in the images formed on the hologram recording medium 30.

In order that images in the non-parallactic direction V are formed on the one-dimensional diffusion plane, the condenser lens 44 and the collimator lens 45 are disposed by taking their focal distances f1 and f2 into account so that the spatial beam modulator 42 and the one-dimensional diffuser plate 47 will be located at optically conjugate positions. Accurately, it is necessary to take the refractive index of the cylindrical lens 46 into account, since the flux coming from the spatial beam modulator 42 to the one-dimensional diffuser plate 47 passes through the inside of the cylindrical lens 46.

In order that the focus in the parallactic direction H is formed on the hologram plane of the hologram recording medium 30, the cylindrical lens 46 is disposed taking its focal distance f3 into account. In this case, the mask 43 and the hologram recording medium 30 are located at optically conjugate positions, and the images in the spatial beam modulator 42 are condensed on the mask 43 through Fourier transform.

As is seen from the above description, by adjusting the positions of the condenser lens 44 and the collimator lens 45 so that the images in the non-parallactic direction V is formed on the one-dimensional diffusion plane of the one-dimensional diffuser plate 47 and thereafter adjusting the position of the cylindrical lens 46 so that the focus in the parallactic direction H is formed on the hologram plane of the hologram recording medium 30, it is possible to record, on the hologram recording medium 30, images which are sharp in both the non-parallactic direction V and the parallactic direction H.

The holographic stereogram exposure apparatus 3 includes a recording medium feeding mechanism 50 capable of intermittently feeding the hologram recording medium 30 by an amount corresponding to one elementary hologram, under the control of the control computer 2. The recording medium feeding mechanism 50 is capable of intermittently feeding the film form hologram recording medium, based on a control signal sent from the control computer 2. In forming a holographic stereogram by the holographic stereogram exposure apparatus 3, images based on the individual image data of the parallax image train are sequentially recorded as paper tablet-like elementary holograms on the hologram recording medium 30 set in a predetermined state on the recording medium feeding mechanism 50.

Now, the operations in forming a holographic stereogram by the holographic stereogram forming apparatus configured as above will be described.

In forming a holographic stereogram, the control computer 2 drives the spatial beam modulator 42 based on image data D5 supplied from the data processing unit 1 to drive the spatial beam modulator 42 to display an image. Thereafter, the control computer 2 outputs a control signal S1 to the shutter 32 to open the shutter 32 for a predetermined period of time, thereby exposing the hologram recording medium 30. In this instance, of the laser beam L2 emitted from the laser source 31 and passed through the shutter 32, the beam L3 reflected by the polarized beam splitter 33b is incident on the hologram recording medium 30 as a reference beam. Simultaneously, the beam L4 transmitted through the polarized beam splitter 33b becomes a projection beam in which the image displayed by the spatial beam modulator 42 is projected, and the projection beam is incident on the hologram recording medium 30 as an object beam. As a result, one image displayed by the spatial modulator beam 42 is recorded as a paper tablet-like elementary hologram on the hologram recording medium 30.

When the recording of one image onto the hologram recording medium 30 is finished, the control computer 2 then outputs a control signal S2 to the recording medium feeding mechanism 50 so as to feed the hologram recording medium 30 by an amount corresponding to one elementary hologram.

Next, the control computer 2 drives the spatial beam modulator 42 based on the next image data D5 supplied from the data processing unit 1, to cause the spatial beam modulator 42 to display the next image. Thereafter, the same operations as above are sequentially repeated, whereby the individual images based on the individual image data D5 supplied from the data processing unit 1 are sequentially recorded as paper tablet-like elementary holograms on the hologram recording medium 30.

Namely, in the present holographic stereogram forming apparatus, the images based on the image data recorded in the storage device 12 are sequentially displayed by the spatial beam modulator 42, the shutter 32 is opened on the basis of each image, and the individual images are sequentially recorded as the paper tablet-like elementary holograms on the hologram recording medium 30. In this case, since the hologram recording medium 30 is fed by an amount corresponding to one elementary hologram on the basis of each image, the individual elementary holograms are aligned in series (continuously) in a horizontal direction (lateral direction). This results in that a plurality of images containing parallax information in the horizontal direction are recorded on the hologram recording medium 30 as a plurality of elementary holograms which are in series (continuous) in the lateral direction, and a holographic stereogram having parallax in the horizontal direction is obtained.

Thereafter, the hologram recording medium 30 with the elementary holograms recorded thereon as above-described is irradiated with ultraviolet rays (UV) and heated, whereby the recorded image is fixed.

When the portion where the image is recorded is entirely fed out to the exterior, the control computer 2 supplies a control signal S2, whereby the portion where the image is recorded, of the hologram recording medium 30, is cut off from the rest, and is discharged to the exterior as one sheet of holographic stereogram.

By the above-described steps, a holographic stereogram having parallax in the horizontal direction H is completed.

While the specific embodiment of the present invention has been described above, the present invention is not limited to the above embodiment, and various modifications are possible within the scope of the invention.

For example, while a holographic stereogram having parallax in the horizontal direction has been described in the above embodiment, the present invention is applicable also to holographic stereograms having parallax in other direction, for example, in the vertical direction.

Besides, while the reflection type hologram has been described as an example in the above embodiment, the present invention can be similarly applied also to the transmission type hologram and the edge-lit type hologram.

While a preferred embodiment of the present invention has been described using specific terms, such description is for illustrative purpose only, and it is to be understood that changes and variations may be made without departing from the spirit or scope of the following claims.

What is claimed is:

1. A holographic stereogram forming apparatus comprising:

a laser source for emitting a laser beam;

beam separating means for separating said laser beam emitted from said laser source into a reference beam and an object beam;

reference beam irradiating means for irradiating a hologram recording medium with said reference beam separated by said beam separating means;

a spatial beam modulator for displaying an image and modulating said object beam separated by said beam separating means;

a one-dimensional diffuser plate for diffusing said object beam modulated by said spatial beam modulator in a one-dimensional direction; and an object projection optical system including a spherical lens system for forming said image displayed by said spatial beam modulator in said one-dimensional direction and a cylindrical lens system for condensing said object beam on said hologram recording medium in a direction substantially orthogonal to said one-dimensional direction said object projection optical system being, disposed between said spatial beam modulator and said one-dimensional diffuser plate for processing said object beam modulated by said spatial beam modulator in such a manner that said image displayed by said spatial beam modulator is formed on said one-dimensional diffuser plate in the one-dimensional direction of the one-dimensional diffuser plate using the spherical lens system, a condensing position of the object beam is controlled by regulating the spacing between said spherical lens system and said cylindrical lens system, wherein a focal distance of the cylindrical lens system and a focal distance of the spherical lens system are selected such that the spatial beam modulator and the one-dimensional diffuser are located at optically conjugate positions.

2. The holographic stereogram forming apparatus according to claim 1, further comprising:

means for shutting off said laser source;

a mechanism for intermittently feeding said hologram recording medium; and a control mechanism for regulating the timings of the display of said image by said spatial beam modulator and the operation of said intermittent feeding mechanism.

3. The holographic stereogram forming apparatus according to claim 1, further comprising:
   a switch configured to shut off said laser source;
   a mechanism configured to intermittently feed said hologram recording medium; and
   a control mechanism configured to regulate the timings of the display of said image by said spatial beam modulator and the operation of said mechanism.

4. A holographic stereogram forming apparatus comprising:
   a laser source for emitting a laser beam;
   beam separator configured to separate said laser beam emitted from said laser source into a reference beam and an object beam;
   reference beam irradiator configured to irradiate a hologram recording medium with said reference beam separated by said beam separator;
   a spatial beam modulator configured to display an image and modulating said object beam separated by said beam separator;
   a one-dimensional diffuser plate configured to diffuse said object beam modulated by said spatial beam modulator in a one-dimensional direction; and
   an object projection optical system including a spherical lens system configured to form said image displayed by said spatial beam modulator in said one-dimensional direction and a cylindrical lens system configured to condense said object beam on said hologram recording medium in a direction substantially orthogonal to said one-dimensional direction, said object projection optical system being, disposed between said spatial beam modulator and said one-dimensional diffuser plate configured to process said object beam modulated by said spatial beam modulator in such a manner that said image displayed by said spatial beam modulator is formed on said one-dimensional diffuser plate in the one-dimensional direction of the one-dimensional diffuser plate using the spherical lens system, wherein
   a condensing position of the object beam is controlled by regulating the spacing between said spherical lens system and said cylindrical lens system, wherein a focal distance of the cylindrical lens system and a focal distance of the spherical lens system are selected such that the spatial beam modulator and the one-dimensional diffuser are located at optically conjugate positions.

* * * * *

UNITED STATES PATENT AND TRADEMARK OFFICE
CERTIFICATE OF CORRECTION

PATENT NO. : 7,046,409 B2  Page 1 of 1
APPLICATION NO. : 10/829202
DATED : May 16, 2006
INVENTOR(S) : Nobuhiro Kihara It is certified that error appears in the above-identified patent and that said Letters Patent is hereby corrected as shown below:

Column 7, line 26, change "longitudinal" to -- latitudinal --.

Column 7, line 38, change "longitudinal" to -- latitudinal --.

Column 7, line 44, change "angel" to -- angle --.

Column 8, line 50, change "is" to -- are --.

Signed and Sealed this

Eleventh Day of August, 2009

David J. Kappos
*Director of the United States Patent and Trademark Office*